United States Patent [19]

Takayasu

[11] 4,291,216
[45] Sep. 22, 1981

[54] PROCESS FOR WELDING OF NOBLE METAL FOIL

[76] Inventor: Kiyosumi Takayasu, No. 5-1, Horida-Dori, Mizuhomku Nagoya City, Japan

[21] Appl. No.: 29,436

[22] Filed: Apr. 12, 1979

[30] Foreign Application Priority Data

Apr. 22, 1978 [JP] Japan .................................. 53/48058

[51] Int. Cl.³ .............................................. B23K 11/16
[52] U.S. Cl. .................................... 219/118; 219/91.2
[58] Field of Search ................... 219/118, 117.1, 91.2; 228/199, 263 R, 263 E, 263 J, 263 G

[56] References Cited

U.S. PATENT DOCUMENTS

| | | | |
|---|---|---|---|
| 2,145,651 | 1/1939 | Funk | 219/118 X |
| 3,355,796 | 12/1967 | Frieling, Jr. | 228/199 X |
| 3,443,055 | 5/1969 | Gwynn et al. | 219/118 X |

FOREIGN PATENT DOCUMENTS 2012645 8/1979 United Kingdom ............... 219/91.2

OTHER PUBLICATIONS

*Van Nostrand's Scientific Encyclopedia,* Fifth Edition, pp. 2330-2331, Van Nostrand Reinhold Company, New York, 1976.
*The Journal of the American Welding Society,* vol. 27, No. 4, Apr. 1948, "The Manufacture and Application of Composite Plates," by O. R. Carpenter, pp. 279-287.

*Primary Examiner*—Gene Z. Rubinson
*Assistant Examiner*—Keith E. George
*Attorney, Agent, or Firm*—Silverman, Cass & Singer, Ltd.

[57] ABSTRACT

A process for welding of noble metal foil includes successively piling a noble metal foil and a thin metal sheet having a high electrical resistance on a side of a metal plate having a high corrosion resistance and a high electrical conduction, mutually welding the foil, the sheet and the plate together and dissolving out only the thin metal thin sheet.

6 Claims, 1 Drawing Figure

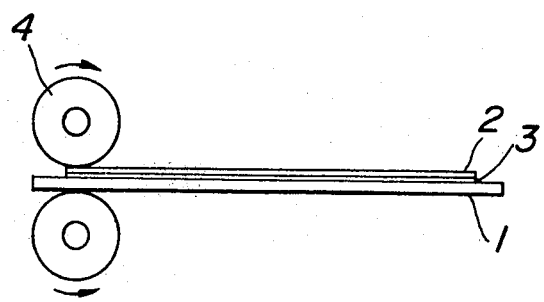

PROCESS FOR WELDING OF NOBLE METAL FOIL

BACKGROUND OF THE INVENTION

The present invention relates to a process for welding a noble metal foil.

In the manufacture of an insoluble anode assembly, there has hitherto been practiced a process wherein an electrode body composed of, for example, lead, copper, iron or the like is covered and welded with a thin plate of a metal such as titanium, tantalum or the like having a corrosion resistance and an electrical conduction. Then an electrically conductive layer of platinum or the like is provided on the outer surface of the thin plate so as to prevent the dissolving of the electrode body into a plating solution and to improve the conduction efficiency of the anode assembly. In this case, the formation of the electrically conductive platinum layer or the like has been carried out by a plating process.

In a plating process, however, it is difficult to form a platinum layer having a thickness great enough to constitute a discharge part of the anode assembly, because the thickness of the platinum layer usually is about $1.5-2\mu$. Further, the time required for the plating becomes very long and pinholes causing the decrease of conduction efficiency often are produced due to poor plating. Moreover, there is a problem with the bonding strength of the platinum layer to the thin plate.

It is an object of the present invention to advantageously solve the aforementioned drawbacks of the prior art and to provide a process for welding a noble metal foil having a desired thickness on a metal plate in a short time.

SUMMARY OF THE INVENTION

According to the present invention, there is provided a process for welding a noble metal foil on a metal plate, which comprises successively piling a noble metal foil and a thin metal sheet having a high electrical resistance on a side of a metal plate having a high corrosion resistance and a high electrical conduction, mutually welding the foil, the sheet and the plate together, and dissolving out only the metal thin sheet to expose the noble metal foil.

BRIEF DESCRIPTION OF THE DRAWING

The present invention will now be described in greater detail with reference to the accompanying drawing, wherein:

A single FIGURE is a schematic illustration of an embodiment for mutually welding a laminate of titanium plate, platinum foil and stainless steel sheet according to the present invention.

DESCRIPTION OF THE PREFERRED EMBODIMENT

According to the present invention, a titanium plate 1 having a thickness of 1.0 mm and a stainless steel sheet 2 having a thickness of 0.1 mm are first cleaned with trichlene and degreased. Then, a platinum foil 3 having a thickness of $10\mu$ and the stainless steel sheet 2 are successively piled on a side of the titanium plate 1 and temporarily bonded to each other to form a laminate with the foil 3 between the plate 1 and sheet 2.

Next, the laminate composed of the stainless steel sheet 2, platinum foil 3 and titanium plate 1 is mutually welded by means of a seam welder 4 under such conditions that the welding current is 12,000-13,000 A, the welding speed is 500 mm/min, the electrode force is 2.5 kg/cm$^2$, and the ratio of current on cycle to current off cycle is 4:2.

After the welding, the laminate is treated with an aqua regia (hydrochloric acid:nitric acid = 10:4) for 30-60 minutes to completely dissolve out or away the stainless steel sheet 2 therefrom, whereby the platinum foil 3 is exposed to form a platinum discharge part.

The present invention is not limited to the specific details shown in the example and various modifications may be made without departing from the scope of the present invention. For instance, tantalum, niobium and zirconium plates may be used as the metal plate having the corrosion resistance and electrical conduction instead of the titanium plate. Further, gold and the like may be used as a noble metal.

According to the present invention, the noble metal layer having a desired thickness, which has never been achieved by the plating process, can be welded easily and inexpensively on the metal plate without forming pinholes. Further, the bonding strength of the noble metal layer to the metal plate is great and the durability of the noble metal layer can be improved.

What is claimed is:

1. A process for welding a noble metal foil having a thickness of not more than $10\mu$ to a metal plate having a high corrosion resistance and a high electrical conduction, there additionally being a thin metal sheet having a high electrical resistance, the process comprising:
   piling on one another: the thin metal sheet, the noble metal foil and the metal plate with the noble metal foil being arranged between the plate and sheet;
   welding the sheet, the foil and the plate together by electric resistance welding to form a laminate; and
   dissolving out the thin metal sheet to leave the noble metal foil welded to the metal plate.

2. The process as claimed in claim 1 in which said noble metal foil is one of platinum foil and gold foil.

3. The process as claimed in claim 1 in which said thin metal sheet is stainless steel sheet.

4. The process as claimed in claim 1 in which said metal plate is one of titanium plate, tantalum plate, niobium plate and zirconium plate.

5. The process as claimed in claim 1 in which said welding is performed by seam welding.

6. The process as claimed in claim 1 in which said dissolving is performed by treating the laminate with aqua regia having a concentration of hydrochloric acid to nitric acid of 10 to 4.

* * * * *